(12) United States Patent
Abrahamson

(10) Patent No.: US 12,287,001 B2
(45) Date of Patent: Apr. 29, 2025

(54) ROLLER BEARING ASSEMBLY

(71) Applicant: JTEKT BEARINGS NORTH AMERICA LLC, Greenville, SC (US)

(72) Inventor: Scott Abrahamson, Piedmont, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 0 days.

(21) Appl. No.: 18/535,723

(22) Filed: Dec. 11, 2023

(65) Prior Publication Data

US 2024/0133425 A1    Apr. 25, 2024

Related U.S. Application Data

(63) Continuation of application No. 16/933,530, filed on Jul. 20, 2020, now Pat. No. 11,885,373, which is a continuation of application No. 15/522,942, filed as application No. PCT/US2014/063659 on Nov. 3, 2014, now abandoned.

(51) Int. Cl.
| | |
|---|---|
| *F16C 19/36* | (2006.01) |
| *F16C 33/46* | (2006.01) |
| *F16C 33/58* | (2006.01) |

(52) U.S. Cl.
CPC .......... *F16C 19/361* (2013.01); *F16C 33/467* (2013.01); *F16C 33/585* (2013.01)

(58) Field of Classification Search
CPC .......... F16C 19/00; F16C 19/22; F16C 19/34; F16C 19/36; F16C 19/361; F16C 33/00; F16C 33/30; F16C 33/467; F16C 33/58; F16C 33/583; F16C 33/585; F16C 33/64; F16C 2240/84

See application file for complete search history.

(56) References Cited

U.S. PATENT DOCUMENTS

| | | |
|---|---|---|
| 2,859,076 A | 11/1958 | Lorig |
| 3,572,860 A | 3/1971 | Hart |
| (Continued) | | |

FOREIGN PATENT DOCUMENTS

| | | |
|---|---|---|
| CA | 2093648 A1 | 2/1993 |
| CH | 117835 A | 12/1926 |
| (Continued) | | |

OTHER PUBLICATIONS

Machine Translation of DE 102005058149 (Year: 2007).*

(Continued)

*Primary Examiner* — Alan B Waits
(74) *Attorney, Agent, or Firm* — Nelson Mullins Riley & Scarborough LLP

(57) ABSTRACT

A roller bearing assembly including an tapered inner cup defining an inner raceway, an tapered outer cup defining an outer raceway, the outer raceway having a convex profile, the convex profile being defined by an intersection of the outer raceway and a central plane in which a longitudinal center axis of the roller bearing assembly lies, and a plurality of straight rollers disposed between the tapered inner cup and the tapered outer cup so that each straight roller is in rolling contact with the inner raceway and the outer raceway, each straight roller having a first end face, a second end face and a cylindrical body extending therebetween.

6 Claims, 7 Drawing Sheets

(56) References Cited

U.S. PATENT DOCUMENTS

| | | |
|---|---|---|
| 3,740,108 A | 6/1973 | Fernlund |
| 4,403,813 A * | 9/1983 | Schaefer ............... F16C 33/467 |
| | | 384/450 |
| 5,005,988 A | 4/1991 | Lyon |
| 5,322,374 A | 6/1994 | Takata |
| 5,902,022 A | 5/1999 | Shattuck et al. |
| 6,315,458 B1 | 11/2001 | Unno et al. |
| 6,354,745 B1 | 3/2002 | Ai |
| 6,767,135 B2 | 7/2004 | Yokota |
| 6,832,971 B2 | 12/2004 | Yamamoto |
| 9,447,821 B2 | 9/2016 | Abrahamson |
| 9,777,767 B2 | 10/2017 | Joki et al. |
| 11,885,373 B2 | 1/2024 | Abrahamson |
| 2014/0270616 A1 * | 9/2014 | Umemoto ............. F16C 35/067 |
| | | 384/569 |
| 2016/0160914 A1 | 6/2016 | Joki et al. |
| 2016/0245335 A1 | 8/2016 | Shattuck |
| 2017/0321745 A1 | 11/2017 | Abrahamson |
| 2020/0347878 A1 | 11/2020 | Abrahamson |

FOREIGN PATENT DOCUMENTS

| | | | |
|---|---|---|---|
| CH | 348580 A | 8/1960 | |
| CN | 101649860 A | 2/2010 | |
| CN | 102444664 A | 5/2012 | |
| DE | 102005058149 A1 * | 7/2007 | ............ F16C 19/361 |
| FR | 397201 A | 5/1909 | |
| FR | 479207 A | 3/1916 | |
| FR | 517696 A | 5/1921 | |
| JP | H044312 A | 1/1992 | |
| JP | H044312 Y2 | 2/1992 | |
| JP | 2001173665 A | 6/2001 | |
| JP | 37-14561 B2 | 11/2005 | |
| JP | 2008240965 A | 10/2008 | |

OTHER PUBLICATIONS

International Search Report and Written Opinion dated Jul. 20, 2015 for PCT/US2014/063659.
Machine Translatin of CH 117835 (Year: 1926).
Machine Translation of DE 102005058149 (Year: 2005).
Notice of Preliminary Rejection dated Jul. 18, 2018 for corresponding South Korean Patent Application No. 10-2017-7011498.
Office Action dated Aug. 2, 2018 for corresponding Japanese Patent Application No. 2017-543704.
Office Action dated Jul. 17, 2018 for corresponding Chinese Patent Application No. 201480083148.4.

* cited by examiner

ROLLER BEARING ASSEMBLY

CROSS-REFERENCE TO RELATED APPLICATIONS

The present application is a continuation of U.S. application Ser. No. 16/933,530 filed Jul. 20, 2020, which is a continuation of U.S. application Ser. No. 15/522,942 filed Apr. 28, 2017 (now abandoned), which is a 35 U.S.C. § 371 national stage application of PCT/US2014/063659, filed Nov. 3, 2014, the entire disclosures of which are incorporated herein.

FIELD OF THE INVENTION

The present invention relates generally to roller bearing assemblies. More particularly, the present invention relates to a roller bearing assembly including straight rollers that can be utilized for applications in which tapered roller bearing assemblies are often used.

BACKGROUND OF THE INVENTION

Various applications require roller bearing assemblies that can handle both axial and radial loads. Typically, roller bearing assemblies used in these applications include a plurality of tapered rollers disposed between a pair of inner and outer raceways, each of which is correspondingly angled, or tapered and meeting at an apex, with regard to a longitudinal center axis of the corresponding bearing assembly to allow for pure rolling. As such, these assemblies are commonly referred to as tapered roller bearing assemblies. Tapered rollers are larger at one end as opposed to the other, and include a body that extends therebetween and is formed by a frustoconical outer surface. As well, the outer surface of a tapered roller's body may be profiled in various applications. As would be expected, such tapered rollers can be difficult and time consuming to manufacture and, therefore, also expensive to manufacture.

As such, it would be desirable to utilize a bearing assembly 10, such as the one shown in FIG. 9, that utilizes a plurality of straight rollers 20, that are relatively easy to manufacture as compared to tapered rollers, and rotatably received in a roller retainer 17 between a tapered inner cup 12 and a tapered outer cup 14 of the bearing assembly. As noted, inner cup 12 and outer cup 14 define an inner raceway 16 and outer raceway 18, respectively, both of which are defined by frustoconical surfaces. Referring additionally to FIG. 10A, a portion of frustoconical outer raceway 18 is shown with a corresponding straight roller 20 when bearing assembly 10 is in the "at rest" position. When the bearing assembly is "at rest," meaning there is no relative rotation between its tapered inner cup 12 and tapered outer cup 14, each straight roller 20 may be in contact with both frustoconical inner raceway 16 and frustoconical outer raceway 18 along the entire length of the roller, as a longitudinal center axis 24 of each straight roller 20 intersects a longitudinal center axis 24 of the bearing assembly.

Note, however, as relative rotation occurs between inner cup 12 and outer cup 14, each straight roller 20 will begin to rotate about its pivot axis 26 (FIG. 9) that is both transverse to its longitudinal center axis 24 and extends outwardly from its midpoint to intersect longitudinal center axis 22 of the bearing assembly. This rotational motion about pivot axis 26 is driven by the tangential speeds of the roller's surfaces relative to their radial position on the inner and outer cups 12 and 14, as best seen in FIGS. 10B and 9.

Note, the full extent to which each straight roller 20 may rotate about its pivot axis 26 is limited by the dimensions of its corresponding retainer roller pocket 23. Rotation of each straight roller 20 about its corresponding pivot axis 26 is due to the fact that its first end face 21 does not have as far to travel along outer raceway 18 as does its second end face 23. For example, as shown in FIG. 10B, for straight roller 20 not to rotate about its pivot axis 26, second end face 23 would have to roll along "fast path" 17 of raceway faster than first end face 21 rolls along "slow path" 19 since fast path 17 is a larger circular path than is slow path 19. Of course, this is not possible as all portions of straight roller 20 roll simultaneously. "Neutral path" 21 represents the path that the midpoint of each straight roller 20 travels along outer raceway 18.

Referring now to FIGS. 10B and 12, the rotation of straight roller 12 about its pivot axis 26 causes frustoconical outer raceway 20 to now function as though it has a concave profile with respect to longitudinal center axis 24 of the straight roller. This concave profile is a hyperbolic conic section as defined by the plane running through longitudinal center axis 24 of the rotated straight rollers 20 and the points where first and second end faces 21 and 23 of the rollers contact outer raceway 18. As shown, this configuration leads to undesirable end loading of straight rollers 20 and, therefore, undesirable stress profiles for the straight rollers. Such end loading can lead to spalling and, ultimately, bearing failure within an unacceptable timeframe.

The present invention recognizes and addresses considerations of prior art constructions and methods.

SUMMARY OF THE INVENTION

One embodiment of a roller bearing assembly, in accordance with the present disclosure, includes a tapered inner cup defining an inner raceway, an tapered outer cup defining an outer raceway, the outer raceway having a convex profile, the convex profile being defined by an intersection of the outer raceway and a central plane in which a longitudinal center axis of the roller bearing assembly lies, and a plurality of straight rollers disposed between the tapered inner cup and the tapered outer cup so that each straight roller is in rolling contact with the inner raceway and the outer raceway, each straight roller having a first end face, a second end face and a cylindrical body extending therebetween.

Another embodiment of a roller bearing assembly, in accordance with the present disclosure, includes an inner cup defining a tapered inner raceway, an outer cup defining a tapered outer raceway, the tapered outer raceway having a convex profile, the convex profile being defined by an intersection of the outer tapered raceway and a central plane in which a longitudinal center axis of the roller bearing assembly lies, a roller retainer having an inner perimeter, an outer perimeter and a frustoconically shaped body extending therebetween, the body defining a plurality of roller pockets, and a plurality of straight rollers disposed between the tapered inner cup and the tapered outer cup, each straight roller being disposed in a corresponding roller pocket of the roller retainer so that each straight roller is in rolling contact with the inner tapered raceway and the outer tapered raceway, each straight roller having a first end face, a second end face and a cylindrical body extending therebetween.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
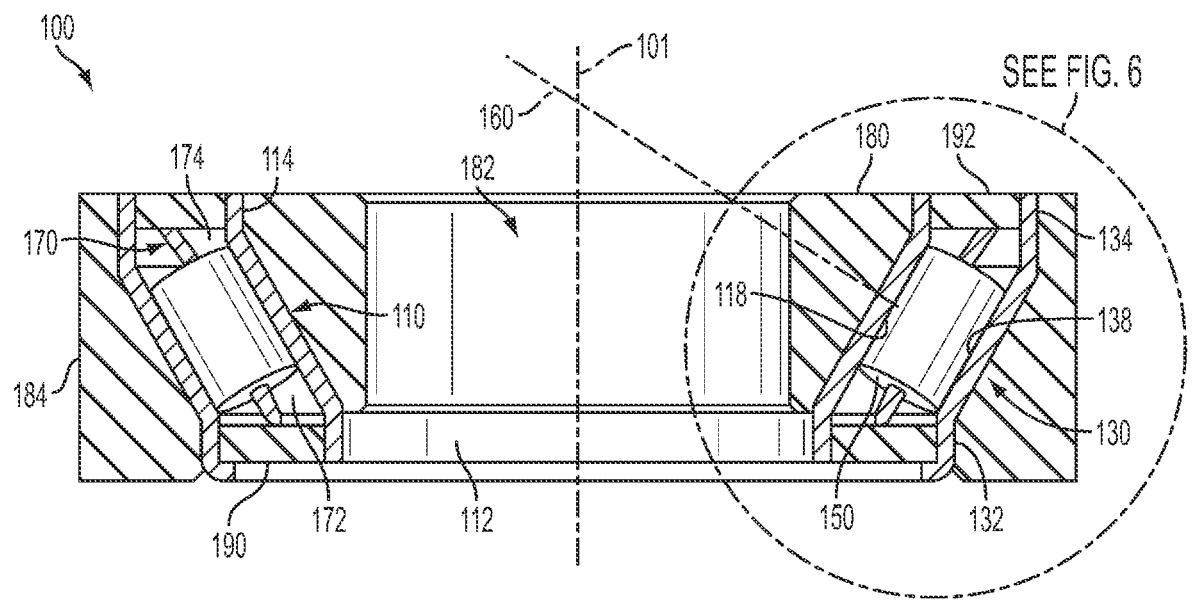
FIG. 1 is a cross-sectional view of a roller bearing assembly in accordance with an embodiment of the present disclosure.

Repeat use of reference characters in the present specification and drawings is intended to represent same or analogous features or elements of the invention according to the disclosure.

DETAILED DESCRIPTION

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 6:
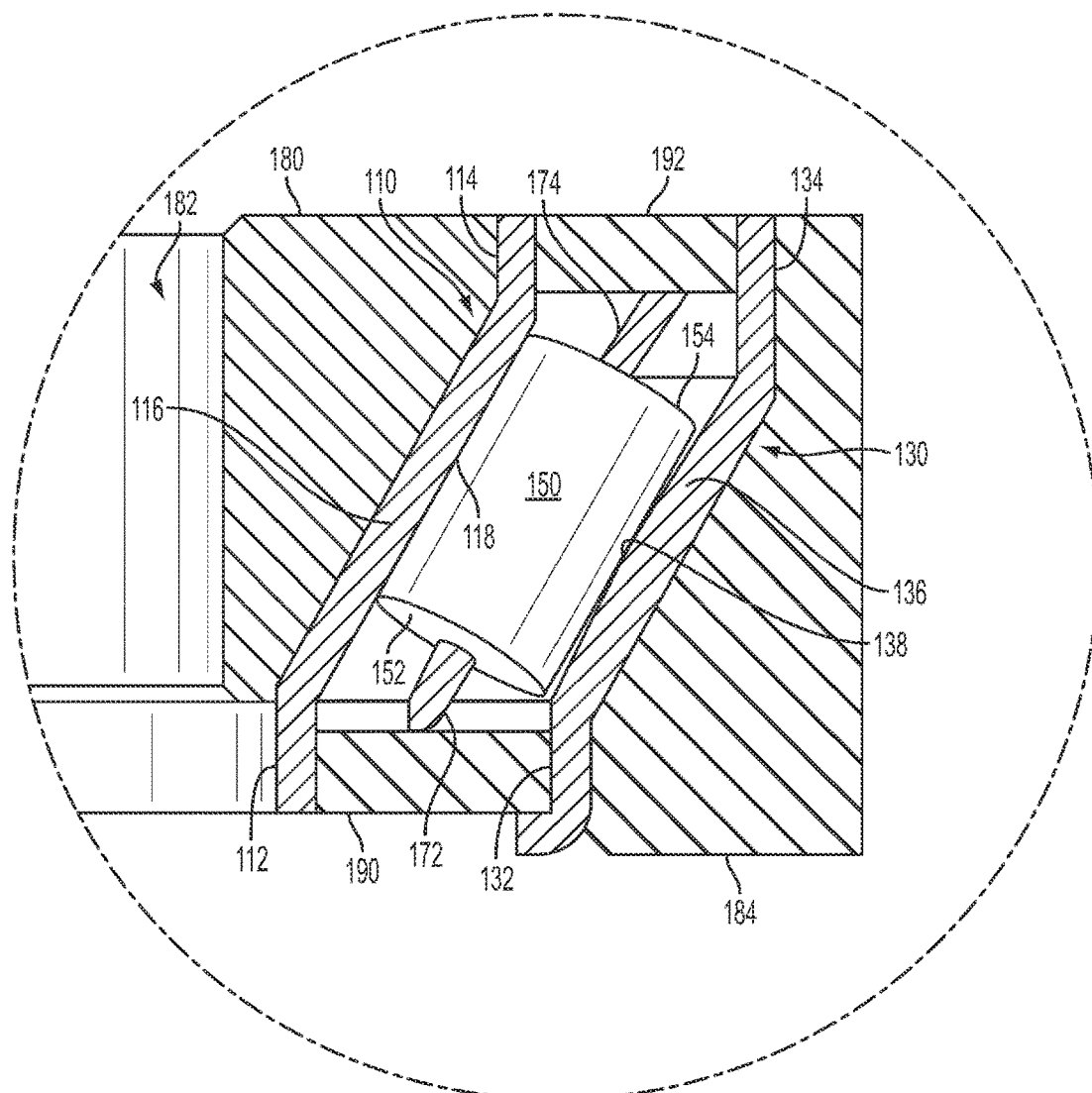
FIG. 6 is an enlarged view of the indicated portion of the cross-sectional view of the roller bearing assembly shown in FIG. 1.
Figure 7:
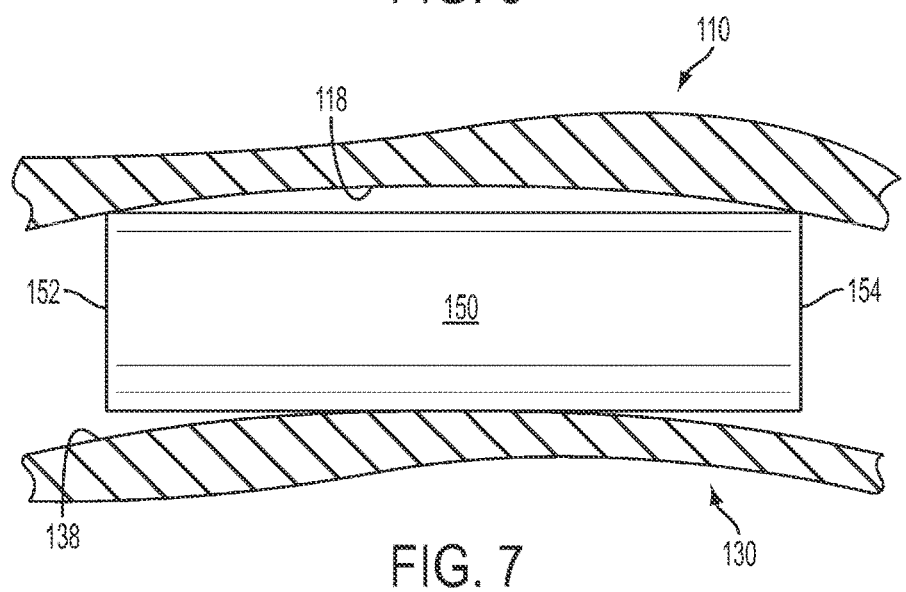
FIG. 7 is a partial cross-sectional view of a second embodiment of a roller bearing assembly in accordance with the present disclosure, wherein the straight roller is at rest.
Figure 8:
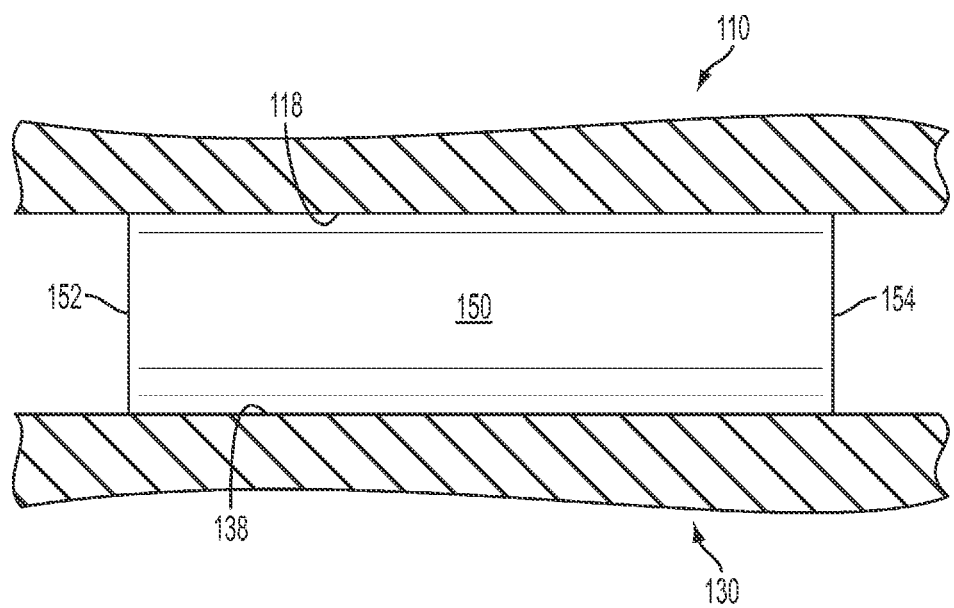
FIG. 8 is a partial cross-sectional view of the second embodiment of a roller bearing assembly shown in FIG. 7 with the present disclosure, wherein the straight roller is in motion.
Figure 9:
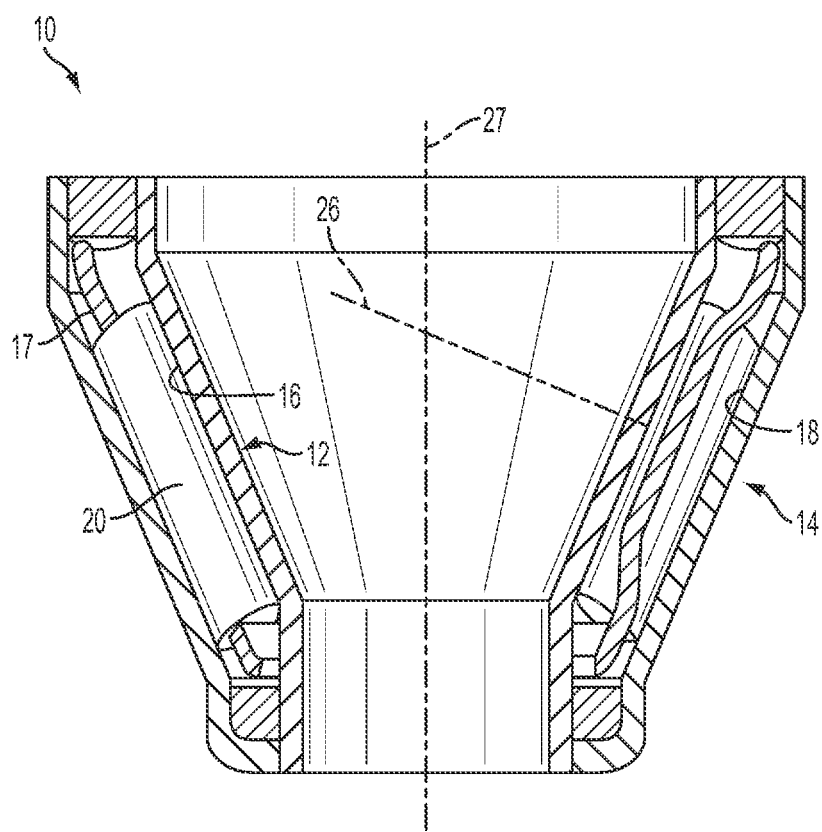
FIG. 9 is a cross-sectional view of a prior art roller bearing assembly.
Figure 10A:
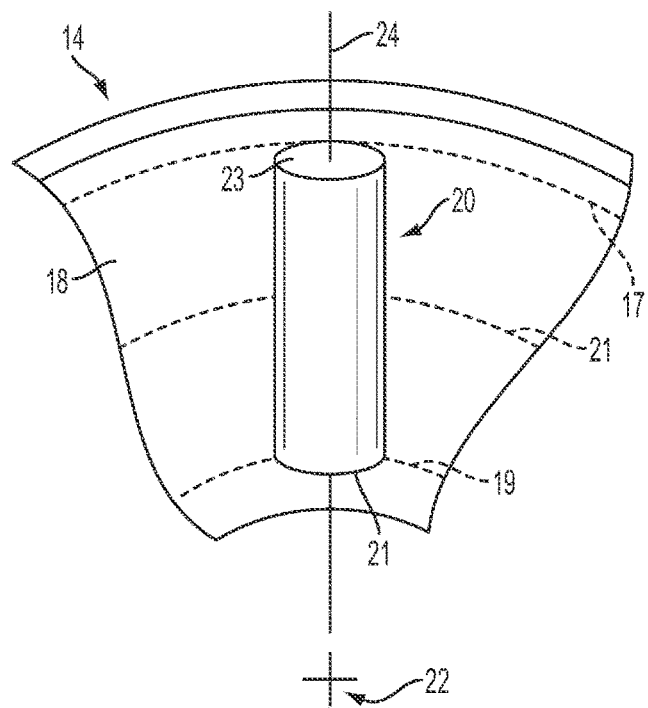
FIG. 10A is a partial top view of an outer cup and a straight roller of the prior art roller bearing assembly shown in FIG. 9, wherein the straight roller is at rest.
Figure 10B:
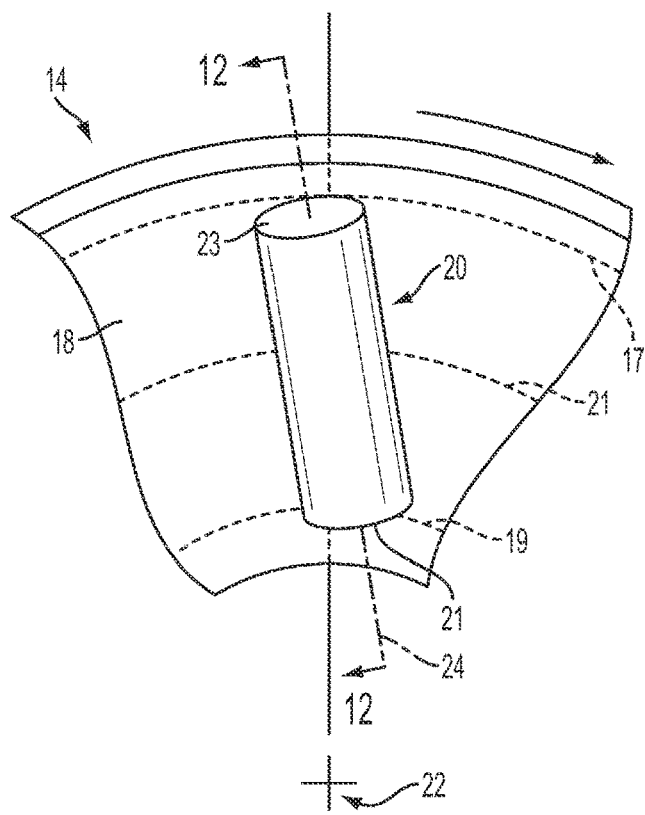
FIG. 10B is a partial top view of an outer cup and a straight roller of the prior art roller bearing assembly shown in FIG. 9, wherein the straight roller is in motion.
Figure 11:
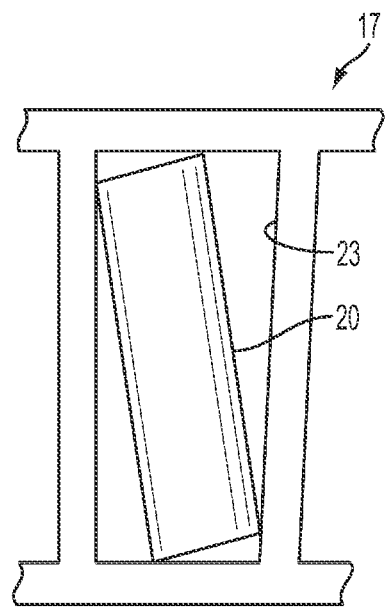
FIG. 11 is a partial view of the roller retainer and a corresponding straight roller of the prior art roller bearing assembly shown in FIG. 9.
Figure 12:
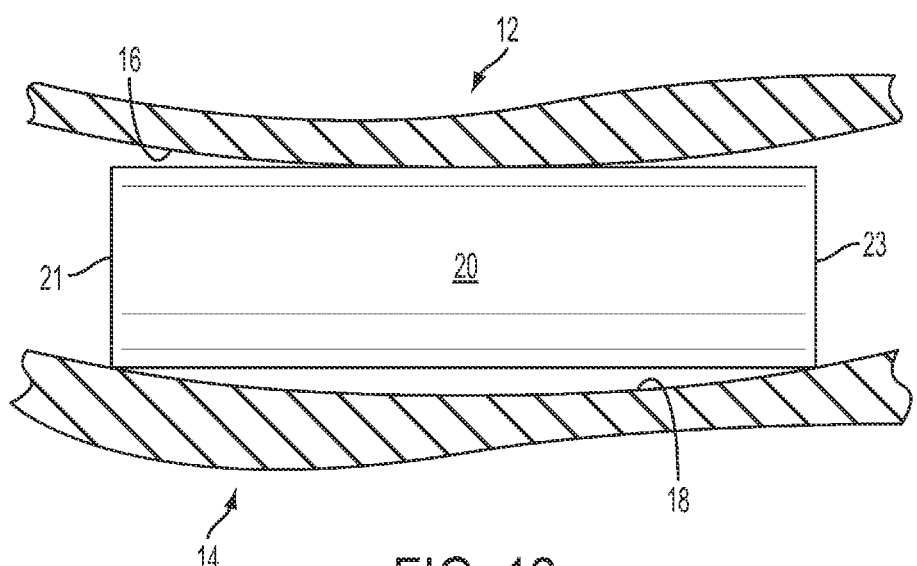
FIG. 12 is a partial cross-sectional view of the prior art roller bearing assembly shown in FIG. 10B, taken along line 12-12.

Referring now to the figures, as shown in FIGS. 1 and 6, an embodiment of a roller bearing assembly 100 in accordance with the present disclosure includes a tapered inner cup 110, a tapered outer cup 130, a roller retainer 170 disposed therebetween that defines a plurality of roller pockets 178, and a plurality of straight rollers 150, each straight roller being rotatably received in a corresponding roller pocket 178. Roller retainer 170 and straight rollers 150 are rotatably received between inner cup 110 and outer cup 130 such that each straight roller 150 is rotatably received between, and in rolling contact with, an inner raceway 118 and an outer raceway 138 defined by inner cup 110 and outer cup 130, respectively. Note, although inner cup 110 and outer cup 130, as shown, are constructed using drawn cup technology, in alternate embodiments the inner cup and the outer cup may be precision ground cups. Additionally, as shown in FIG. 1, an inner collar 180 defining a central shaft bore 182 is disposed radially inwardly of inner cup 110 and an outer collar 184 is disposed radially outwardly of outer cup 130, to facilitate installation of bearing assembly.

Figure 3:
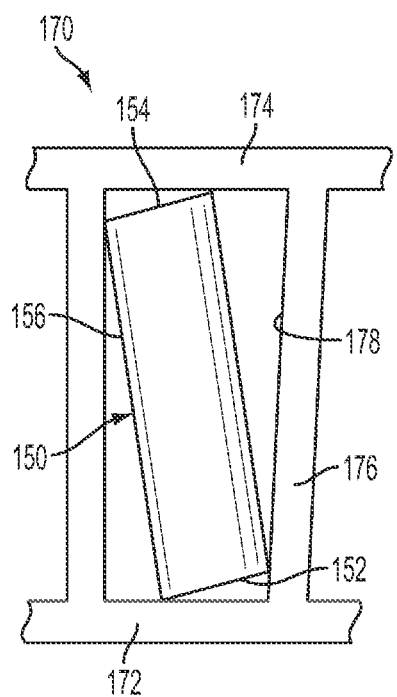
FIG. 3 is a partial view of the roller retainer and a corresponding straight roller of the roller bearing assembly shown in FIG. 1.

Referring now to FIG. 3, in the embodiment shown, roller retainer 170 includes an annular first end member 172, an annular second end member 174, and a plurality of elongated central members 176 extending therebetween, thereby forming the plurality of roller pockets 178. Referring additionally to FIG. 1, in that second end member 174 has a greater diameter than first end member 172, central members 176 extend between first end member 172 and second end member 174 in a frustoconical fashion. A straight roller 150 is rotatably received in a corresponding roller pocket 178, each straight roller 150 including a first end face 152, a second end face 154, and a cylindrical body extending therebetween. The dimensions of roller pockets 178 of roller retainer 170 are selected to limit the extent to which each corresponding straight roller 150 is allowed to rotate about its corresponding pivot axis 160 (FIG. 1), as inner cup 110 and outer cup 130 rotate relative to each other, as discussed in greater detail below. Note, the dimensions of roller pocket 178 as shown in FIG. 3 are exaggerated, as is the extent to which straight roller 150 is able to rotate therein, for illustrative purposes only.

Figure 2A:
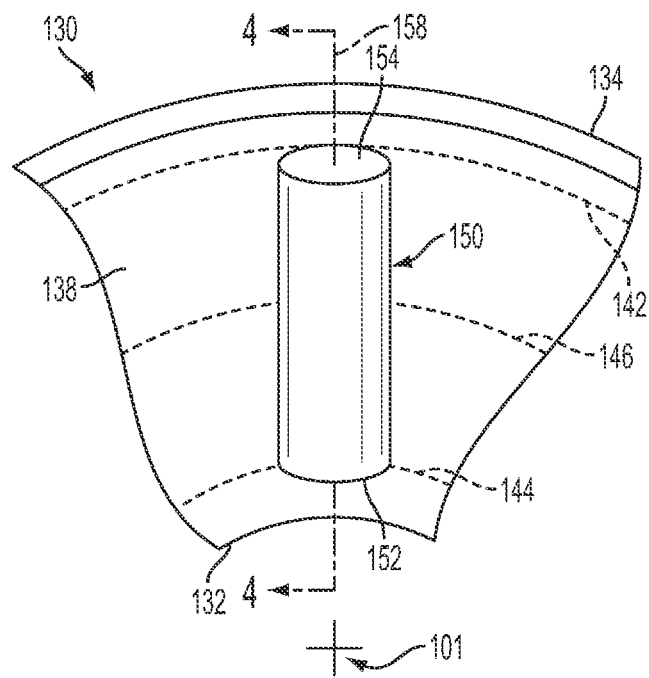
FIG. 2A is a partial top view of an outer cup and straight roller of the roller bearing assembly shown in FIG. 1, wherein the straight roller is at rest.
Figure 4:
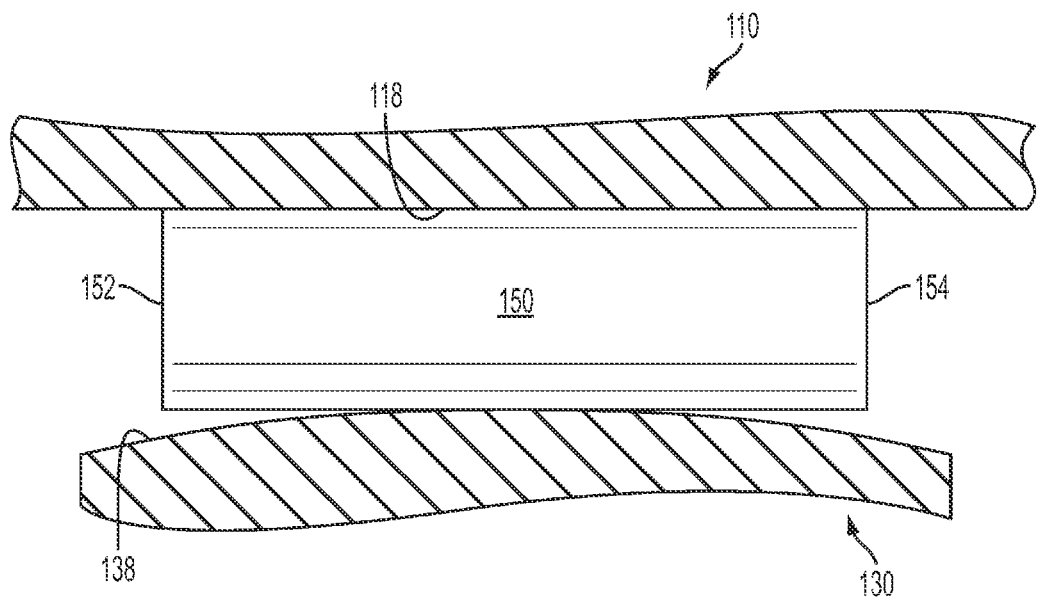
FIG. 4 is a partial cross-sectional view of the roller bearing assembly shown in FIG. 2A, taken along line 4-4.

As best seen in FIG. 6, inner cup 110 includes an annular inner flange 112, and annular outer flange 114, and a frustoconically shaped body 116 extending therebetween. The frustoconically shaped inner surface of body 116 is adjacent inner collar 180, whereas the frustoconically shaped outer surface of body 116 defines inner raceway 118 of roller bearing assembly 100. Similarly, outer cup 130 includes an annular inner flange 132, an annular outer flange 134, and a frustoconically shaped body 136 extending therebetween. As well, the frustoconically shaped outer surface of body 136 is adjacent outer collar 184. Note, however, outer raceway 138 of bearing assembly 100, which is defined by the inner surface of the outer cup's body 136, is not defined by frustoconical surface. Rather, outer raceway 138 defines a convex profile, as defined by the intersection of a plane of symmetry of rolling bearing assembly 100, that being any plane in which a longitudinal center axis 101 of the bearing assembly lies, with outer raceway 138 of outer cup 130. As such, as shown in FIGS. 2A and 4, when straight roller 150 is in the "at rest" position, that being when there is no relative motion between inner cup 110 and outer cup 130 and a longitudinal center axis 158 of straight roller 150 intersects longitudinal center axis 101 of roller bearing assembly 100, straight roller 150 is in contact with inner raceway 118 along its entire length. However, due to the convex profile of outer raceway 138, straight roller 150 is only in contact with outer raceway along a portion of its full length, that being a middle portion.

Figure 2B:
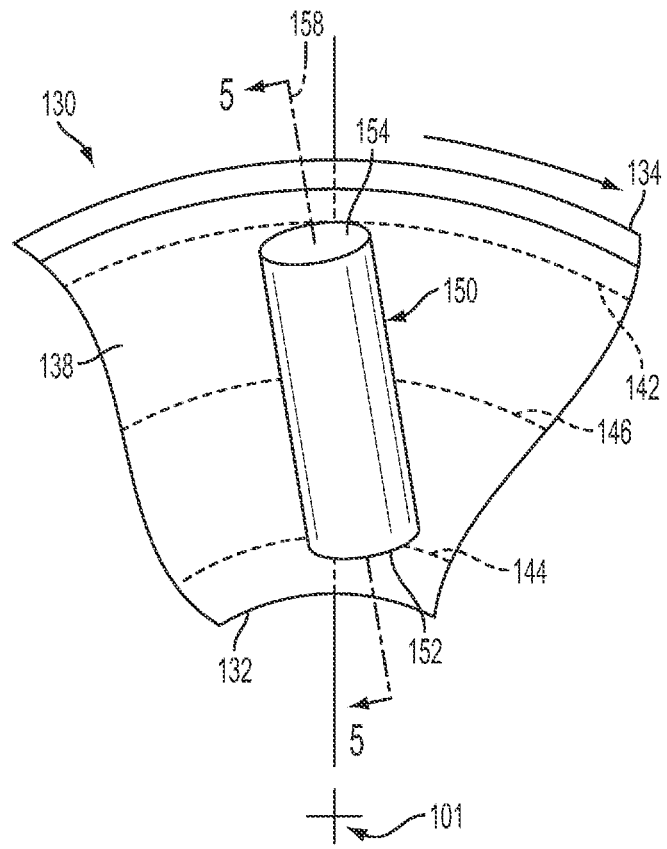
FIG. 2B is a partial top view of an outer cup and straight roller of the roller bearing assembly shown in FIG. 1, wherein the straight roller is in motion.
Figure 5:
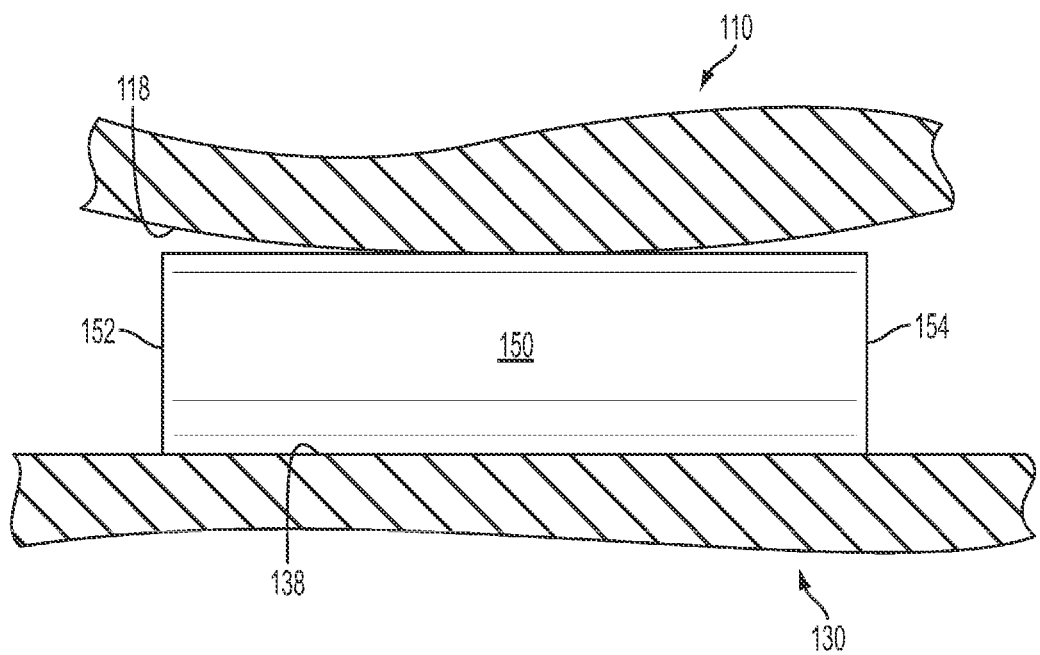
FIG. 5 is a partial, cross-sectional view of the roller bearing assembly shown in FIG. 2B, taken along lines 5-5.

However, as relative rotation occurs between inner cup 110 and outer cup 130, each straight roller 150 will begin to rotate about its pivot axis 160 (FIG. 1) that is both transverse to its longitudinal center axis 158 and extends outwardly from its midpoint to intersect longitudinal center axis 101 of the bearing assembly. This rotational motion about pivot axis 160 is best seen in FIGS. 2B and 5. Note, the full extent to which each straight roller 150 may rotate about its pivot axis 160 is limited by the dimensions of its corresponding roller pocket 178, as shown in FIG. 3. As previously noted, the rotation of each straight roller 150 about its corresponding pivot axis 160 is due to the fact that its first end face 152 does not have as far to travel along outer raceway 138 as does its second end face 154. For example, as shown in FIG. 2B, for straight roller 150 not to rotate about its pivot axis 160, second end face 154 would have to roll along "fast path" 142 of raceway faster than first end face 152 rolled along "slow path" 144 since fast path 142 is a larger circular path than is slow path 144. Of course, this is not possible as all portions of straight roller 20 roll simultaneously. "Neutral path" 146 represents the path that the midpoint of each straight roller 20 travels along outer raceway 138.

Referring now to FIGS. 2B and 5, unlike the previously discussed prior art bearing assembly 10 shown in FIGS. 9 through 12, the rotation of each straight roller 150 about its pivot axis 160 causes convex outer raceway 130 to now function as though it has a straight profile with respect to longitudinal center axis 158 of the straight roller. Specifically, the middle portion of each straight roller 150 of the disclosed roller bearing assembly 100 maintains contact with outer raceway 138 as the straight roller rotates about its pivot axis 160, whereas the middle portion of each straight roller 20 in the prior art bearing assembly loses contact with outer raceway 18, resulting in the end loading of the rollers. As such, as the rotation of the disclosed straight rollers 150 causes their end portions to come into contact with outer raceway 138, an even greater portion of each straight roller 150 is in contact with outer raceway 138 than when the straight rollers are in the at rest position shown in FIGS. 2A and 4. Therefore, the convex outer raceway 138 of the disclosed bearing assembly 100 leads to reduced end loading of straight rollers and, therefore, reduced spalling.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:
1. A roller bearing assembly comprising:
a tapered inner cup defining an inner raceway;
a tapered outer cup defining an outer raceway, the outer raceway having a convex profile, the convex profile being defined by an intersection of the outer raceway and a central plane in which a longitudinal center axis of the roller bearing assembly lies, the tapered outer and inner cups being concentric about the longitudinal center axis;
a plurality of straight rollers disposed between the tapered inner cup and the tapered outer cup so that each straight roller is in rolling contact with the inner raceway and the outer raceway, each straight roller having a first end face, a second end face and a cylindrical body extending therebetween; and
a roller retainer defining a plurality of roller pockets, each roller pocket receiving a corresponding straight roller, and each roller pocket being symmetrical and having dimensions so that each straight roller is limitedly rotatable in both directions about a pivot axis that intersects the longitudinal center axis of the roller bearing assembly and a midpoint of the longitudinal center axis of the corresponding straight roller, wherein the pivot axis is transverse to the longitudinal center axis of the corresponding straight roller.

2. The roller bearing assembly of claim 1, wherein the inner raceway is defined by a frustoconical surface.

3. The roller bearing assembly of claim 1, wherein the tapered inner cup and the tapered outer cup further comprise drawn cups.

4. A roller bearing assembly, comprising:
an inner cup defining a tapered inner raceway;
an outer cup defining a tapered outer raceway, the tapered outer raceway having a convex profile, the convex profile being defined by an intersection of the outer tapered raceway and a central plane in which a longitudinal center axis of the roller bearing assembly lies, the outer and inner cups being concentric about the longitudinal center axis;
a roller retainer having an inner perimeter, an outer perimeter and a frustoconically shaped body extending therebetween, the body defining a plurality of roller pockets; and
a plurality of straight rollers disposed between the tapered inner cup and the tapered outer cup, each straight roller being disposed in a corresponding roller pocket of the roller retainer so that each straight roller is in rolling contact with the inner tapered raceway and the outer tapered raceway, each straight roller having a first end face, a second end face and a cylindrical body extending therebetween,
wherein each roller pocket is symmetrical and has a maximum width that is greater than a maximum width of each corresponding straight roller so that each straight roller is limitedly rotatable in both directions about a pivot axis that intersects the longitudinal center axis of the roller bearing assembly and a midpoint of the longitudinal center axis of the corresponding straight roller, wherein the pivot axis is transverse to the longitudinal center axis of the corresponding straight roller.

5. The roller bearing assembly of claim 4, wherein the inner raceway is defined by a frustoconical surface.

6. The roller bearing assembly of claim 4, wherein the inner cup and the outer cup further comprise drawn cups.

* * * * *